(12) United States Patent
Wang et al.

(10) Patent No.: US 6,766,427 B1
(45) Date of Patent: Jul. 20, 2004

(54) METHOD AND APPARATUS FOR LOADING DATA FROM MEMORY TO A CACHE

(75) Inventors: Avery Wang, Palo Alto, CA (US); Richard W. Webb, Los Gatos, CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/607,814

(22) Filed: Jun. 30, 2000

(51) Int. Cl.[7] ............................................. G06F 13/00
(52) U.S. Cl. ...................... 711/154; 711/126; 711/194; 711/158
(58) Field of Search .................... 711/126, 118, 711/3, 165, 138, 144, 154, 158

(56) References Cited

U.S. PATENT DOCUMENTS 6,230,241 B1 * 5/2001 McKenney ................. 711/118
6,446,157 B1 * 9/2002 McGehearty et al. .......... 711/5

OTHER PUBLICATIONS

Patterson, David and John Hennessy. Computer Organization and Design: The Hardware/Software Interface. 1998, Morgan Kaufmann Publishers, Inc. Second Edition. pp. 540–547 and 568–570.*

Hennessy and Patterson, Computer Architecture: A Quantitative Approach, 1996, Morgan Kaufmann Publishers, Inc, second edition, pp. 74–80.*

* cited by examiner

*Primary Examiner*—Reba I. Elmore
(74) *Attorney, Agent, or Firm*—Vedder, Price, Kaufman & Kammholz, P.C.

(57) ABSTRACT

A method and apparatus for loading data from memory to a cache is provided. The method and apparatus provide substantially improved performance, especially in conjunction with large data arrays for which each element of data is processed completely at once and need not be later accessed. A technique is provided to allow a data element to be loaded directly to a cache location corresponding to the local variable used to process that data element, thereby avoiding copying of the data element to multiple cache locations. In conjunction with the use of non-caching stores of processed results back into main memory, this technique completely avoids cache thrashing within the framework of a conventional microprocessor architecture. This technique is ideally suited for high-performance processing of streaming multimedia data including video processing.

32 Claims, 8 Drawing Sheets

METHOD AND APPARATUS FOR LOADING DATA FROM MEMORY TO A CACHE

TECHNICAL FIELD OF THE INVENTION

The invention relates generally to processing information using computers and more specifically to a technique to load data from memory to a cache.

BACKGROUND OF THE INVENTION

Computer system performance is sometimes limited by the rate and latency at which data can be transferred between memory and a processor. In an effort to increase the rate at which data can be provided to the processor and reduce access latency, a cache allowing faster access to a relatively small amount of data is often interposed between the memory and the processor. However, such a configuration can impede system performance under certain conditions.

Conventional caching memory architectures are described in Chapter 5 (pp. 373–484) of David A. Patterson and John L. Hennessy, Computer Architecture A Quantitative Approach, Second Edition, Morgan Kaufmann Publishers, Inc., San Francisco, Calif., 1990, 1996, which is incorporated herein by reference.

Conventional caching memory architectures have been developed under the assumption of a random pattern of data access. However, some applications, for example multimedia (e.g., graphics, video, and/or audio) processing, involve different data access patterns for which conventional caching architectures are suboptimal. For example, processing of multimedia data typically occurs in well-defined regular patterns that may be known even before the multimedia data is actually processed. The regularity encountered in the processing of multimedia data not only makes conventional caching architectures suboptimal, but even leads to serious degradation in performance in such architectures.

Moreover, conventional caching architectures are generally insensitive to the manner in which data will be used once they are loaded into the cache. For example, some types of data (e.g., multimedia data), which may be referred to as short-term data, are typically used once and not needed thereafter. However, other types of data (e.g., program code or program state variables), which may be referred to as long-term data, will be accessed repeatedly. Since conventional caching architectures are insensitive to these differences, they tend to keep short-term data in cache longer than necessary, causing cache pollution and resulting in eviction from the cache of long-term data when not desired. Since data that are not needed for later use are retained, while data that are needed for later use are evicted, conventional caching architectures operate inefficiently under such circumstances.

FIG. 1 is a block diagram illustrating a system architecture of the prior art. The system architecture includes memory 101, cache 102, memory management unit (MMU) 103, and processor 104. Processor 104, which may also be referred to as a central processing unit (CPU), includes registers 105. Memory 101 is coupled to cache 102 via bus 106. Cache 102 is coupled to MMU 103 via bus 107. MMU 103 is coupled to processor 104 via bus 108. Alternatively, processor 104 may be coupled to cache 102 via bus 109.

Processor 104 can execute an instruction to cause a data element stored in memory 101 to be loaded to one of registers 105 via cache 102 and MMU 103. Processor 104 can also execute an instruction to cause data stored in one of registers 105 to be written to memory 101 via MMU 103 and cache 102. When loading a data element from memory 101 or writing data to memory 101, the information passes through and is stored in cache 102.

A cache generally allows faster access to information than regular memory. Thus, storing information in a cache can help improve system performance by allowing faster subsequent access to information previously stored in cache. However, processing of large arrays of data often requires only a single access to each data element. Thus, use of a cache for such operations can impede system performance.

FIG. 2 is a block diagram illustrating a system of the prior art. The system includes data input array 201, data input array 202, data output array 203, cache 102, and central processing unit (CPU) 104. Data input array 201 includes data element 206. Data input 202 includes data element 207. Data output array 203 includes data element 208. Data input array 201 exists in memory with software variables 209. Software variables 209 include local variable 210. Cache 102 includes cache location 211. CPU 104 includes registers 105.

In the prior art, data elements from data input arrays 201 and 202 are stored in cache 102 prior to processing by CPU 104. When software executed by CPU 104 processes these data elements, a local copy of the value of the data elements is stored in software variables 209. A copy of a local variable in local variables 209 is stored in cache 102. When a result is computed by CPU 104, the result is written to cache 102, and, subsequently, to data output array 203. A technique, such as direct mapping or least recently used (LRU) set-associativity, is provided to determine where in cache 102 data are to be stored. Unfortunately, the technique for determining where in cache 102 data are to be stored does not provide a safeguard to ensure that data from data input array 201, data from data input 202, and software variables from software variables 209 do not map to the same cache location in cache 102. As large arrays of data, spanning several blocks of memory, are processed, it is almost inevitable that the various data elements will map to the same cache location at the same time. This is referred to as cache aliasing. When this happens, it results in thrashing, where data is read from the data array into cache 102 and immediately replaced in cache 102 with other data from a different data array without being used. Thus, many additional unanticipated accesses to data arrays are required to process the data. Multiple accesses to data arrays degrade system performance because the processor 104 must stall while waiting for the data to arrive.

FIG. 3 is a block diagram illustrating a technique of the prior art. As in FIG. 2, a data input array 201 includes a data element 206. The value stored at data element 206 is read into cache location 301 of cache 102. When the value at cache location 301 is processed, it is copied to a local variable used in the course of processing, the value at cache location 301 is copied to cache location 302, which corresponds to a local variable 210 of local variables 209. When the value stored at cache location 302 is to be evicted from cache 102, it is evicted to local variable 210 of local variables 209.

Movement of the same data between multiple locations in cache 102, data input array 201, and local variables 209 impedes system performance because the data occupies multiple locations in the cache 102, resulting in more cache traffic and thrashing. Thus, this prior art technique has significant disadvantages.

Other prior art techniques have been attempted. One example is uncached loads and stores when used with a single register. This technique is disadvantageous in that it can require loading the same cache line several times (e.g., four times to load four registers).

Another prior art technique is the use of associative cache. Two-way set associative cache with each memory location mapping to two possible cache locations may be used. However, associative cache is more expensive and more complicated. Moreover, thrashing problems can still occur with two-way set associative cache when multiple sets of data are being processed through the cache. Fully associative cache may be used, but is expensive and complicated. LRU and pseudo-LRU techniques used with associative caches are not necessarily valid for multimedia data because the data are generally accessed only once, and there is no need for persistence of the data in the cache.

Use of direct mapped cache is another technique. Direct mapped cache provides only one location in cache for each memory location. Direct mapped cache also suffers from aliasing problems, and, consequently, cache thrashing.

Another prior art technique involves prefetching data. This technique brings data into the cache, but not into the registers, with the intent of minimizing or hiding the load-use delay. This technique also suffers from the potential for thrashing problems and, in some circumstances, exacerbates problems.

As described above, the prior art techniques have the potential for causing cache thrashing. While cache thrashing may be unlikely to occur, the performance penalties resulting from cache thrashing are so significant that overall performance can be degraded substantially even when cache thrashing occurs only infrequently as illustrated by Amdahl's Law. Thus, a method and apparatus to increase system performance in a system with memory and a cache that avoids the performance penalties of the prior art is needed.

DETAILED DESCRIPTION OF A PREFERRED EMBODIMENT

Figure 1:
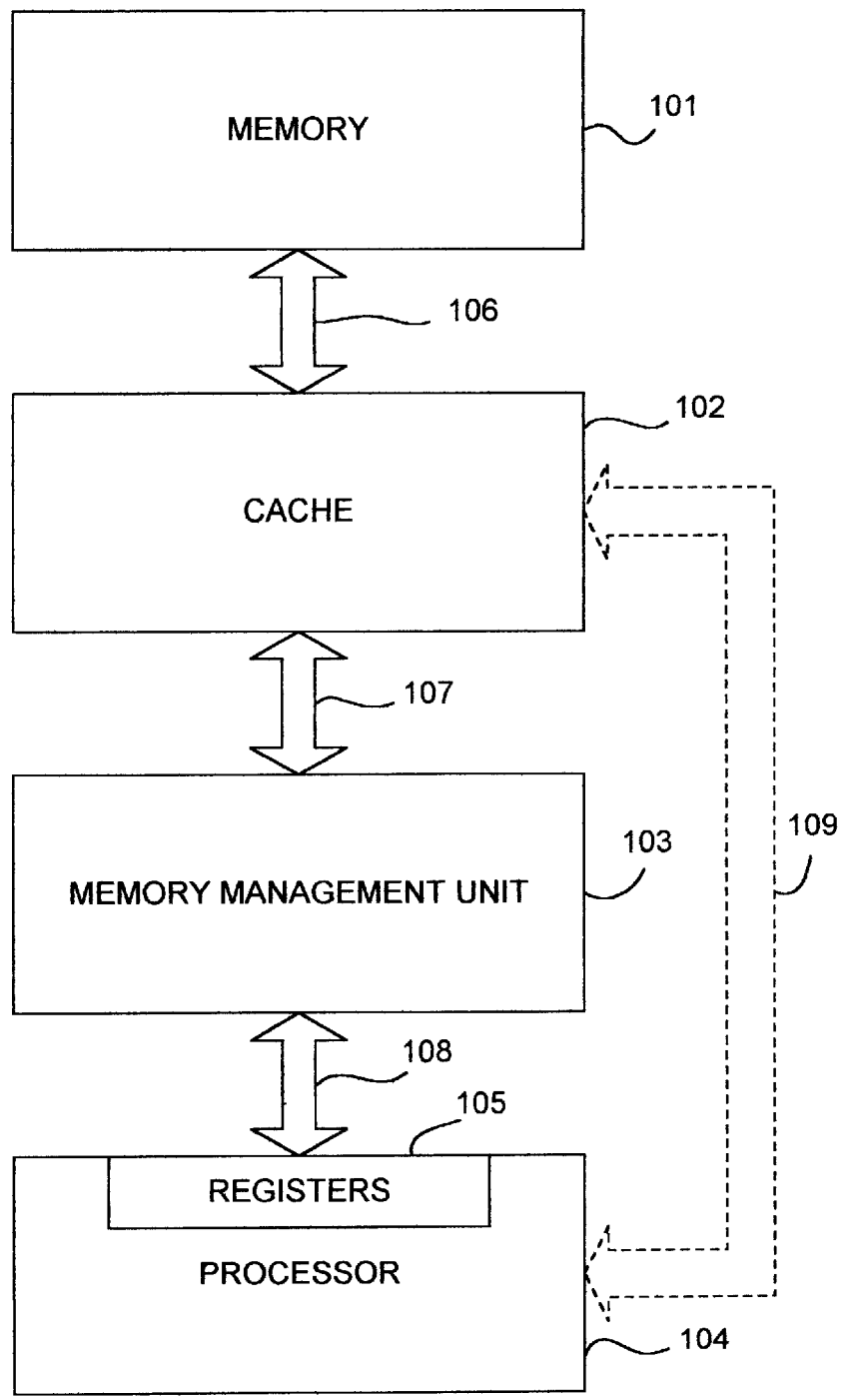
FIG. 1 is a block diagram illustrating a system architecture of the prior art.
Figure 2:
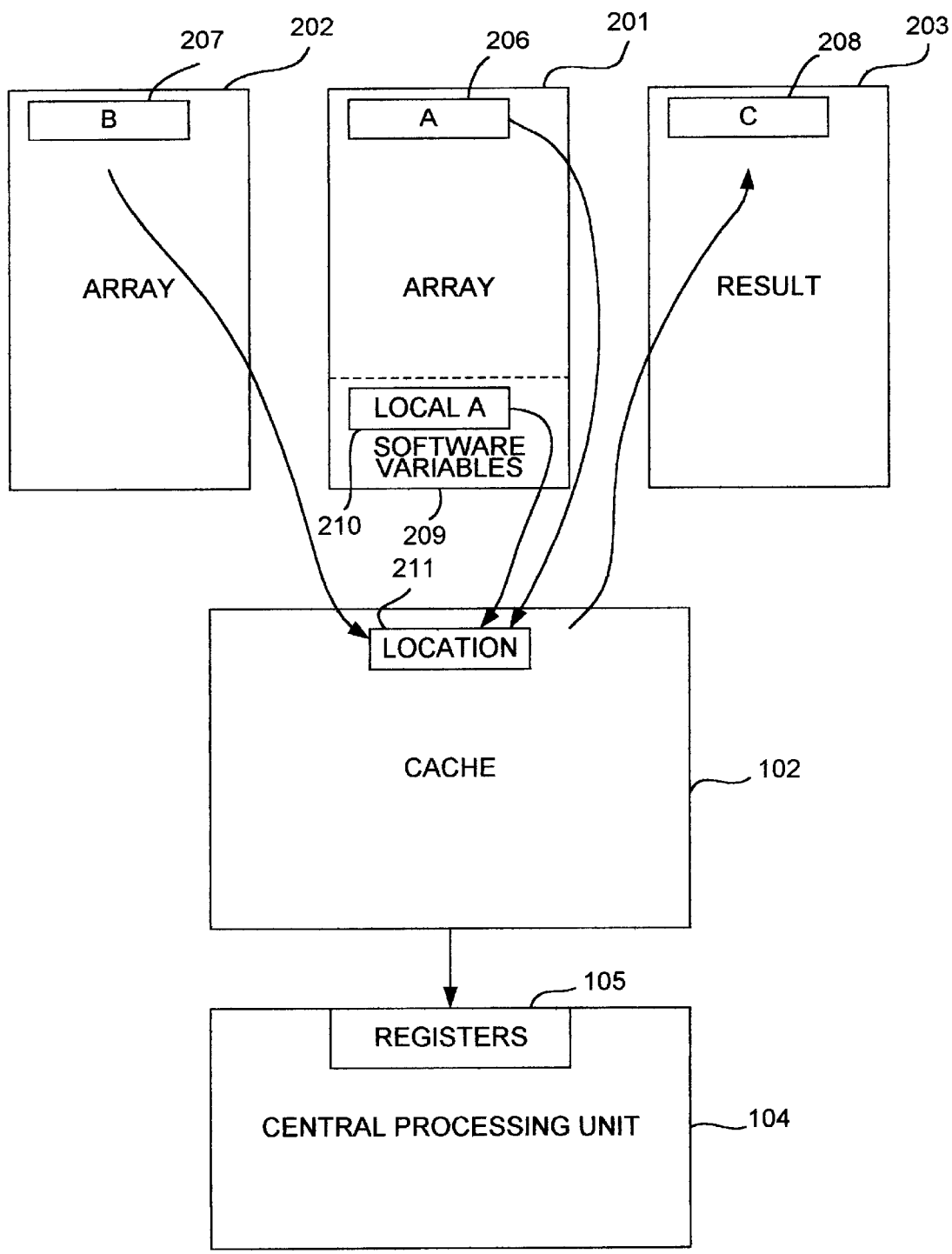
FIG. 2 is a block diagram illustrating a system of the prior art.
Figure 3:
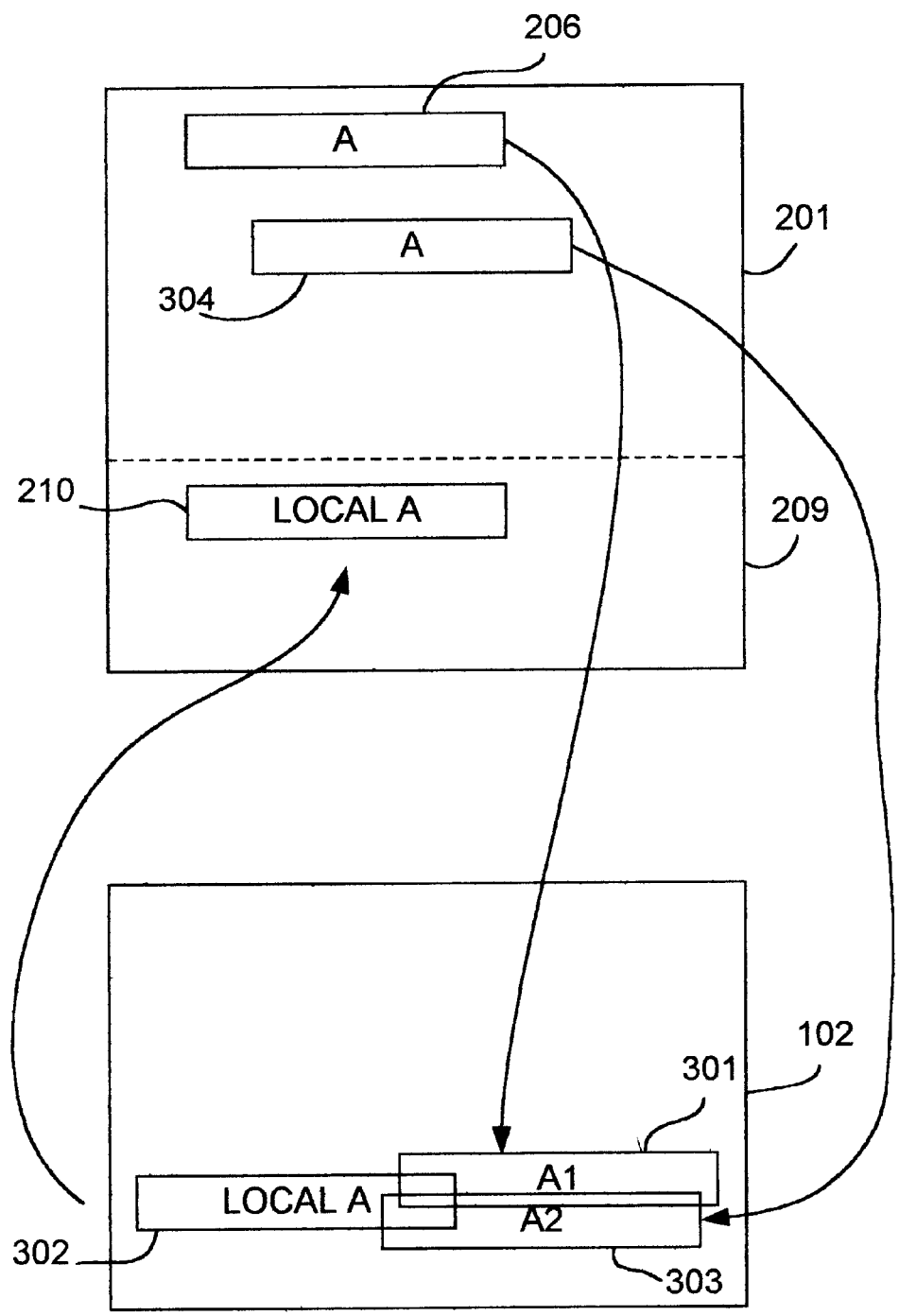
FIG. 3 is a block diagram illustrating a technique of the prior art.

A method and apparatus for loading data from memory to a cache is described. The method and apparatus provide substantially improved performance, especially in conjunction with large data arrays for which each element of data is processed completely at once and need not be later accessed. A technique is provided to allow data elements to be loaded to a cache location corresponding to a local variable used to process those data elements, thereby avoiding copying of the data elements to multiple locations in the cache. A result obtained by processing the data element may be stored directly to a data output array, thus avoiding writing the result into cache.

A new memory copy instruction is implemented that allows a source address (e.g., A) and a destination address (e.g., local A) to be specified. The new instruction obtains data from memory at the source address and places the data in the cache at a location corresponding to the destination address. The cache locations correspond to memory locations based on cache tags. Since the location of a local variable maps to the same location in the cache regardless of the source address for the data being loaded into the local variable, the location of the local variable may be specified as the destination address for the new instruction. The corresponding cache tag is set to reflect the relationship between the memory location being copied and the cache location corresponding to the destination address. The ability of the new instruction to copy the data from memory directly to the cache location of the desired local variable is beneficial, as it avoids the need to copy the data into a separate cache location (e.g., cache location 301) and copy it from that cache location to the cache location of the local variable.

When the new instruction is used to copy data directly to the cache location of the local variable, the data previously stored in the cache location of the local variable is overwritten by the newly copied data. This overwriting is not problematic since the data previously stored in the cache location of the local variable will have already been processed and is no longer needed. Moreover, the overwriting is beneficial, as it avoids the need to perform a write-back of the cache location of the local variable to the memory address of the local variable, thereby increasing performance. The write-back is not needed, as the presence of the desired data in the cache location corresponding to the local variable is sufficient to provide the central processing unit with the desired data for processing, and there is no need to retain the previous value of the local variable since processing for that previous value will have already been completed and the result of the processing stored.

The operation of the new instruction is determined by whether or not the desired data is already in the cache. If the desired data (e.g., A) is already in the cache, the cached copy of the desired data may be copied to the cache location of the appropriate local variable (e.g., local A). However, if the desired data is not already in the cache, the new instruction copies the data from the memory location at which the desired data is located to the cache location of the local variable. After processing of the data has been completed, the result of the processing may be written directly to memory using an uncached (non-allocating) store instruction to avoid unnecessary cache operations. By using the new instruction in conjunction with a non-allocating store instruction, cache misses may be completely avoided.

The present invention may be practiced in many embodiments. For example, a double (or multiple) buffering approach may be used to allow a second operation to be performed to read a second data element of data from memory at a second source address and to write the second data element directly to a fourth corresponding cache location. By writing the second data element directly to the fourth corresponding cache location rather than to a second corresponding cache location (where a first data element was already directly written), interference with the first data element can be avoided. Moreover, use of the fourth corresponding cache location, in addition to the second corresponding cache location can increase processing efficiency by effectively pipelining the processing of multiple data elements.

Alternatively, if such a double (or multiple) buffering approach is not desired, cache usage, and, therefore, the likelihood of cache location conflicts and consequent thrashing, may be reduced by writing the second data element directly to the second corresponding cache location. It can also be readily appreciated that the double buffering approach may be extended to multiple buffering involving a greater degree of pipelining by using a larger number of cache locations. Since the cache locations may be reused over time for subsequent data elements, disturbance of the cache (e.g., thrashing) may be minimized. Moreover, since the cache locations may be independent of source addresses in memory where the data elements are stored, cache interference as a function of source addresses (e.g., cache location aliasing) may be avoided.

Figure 4:
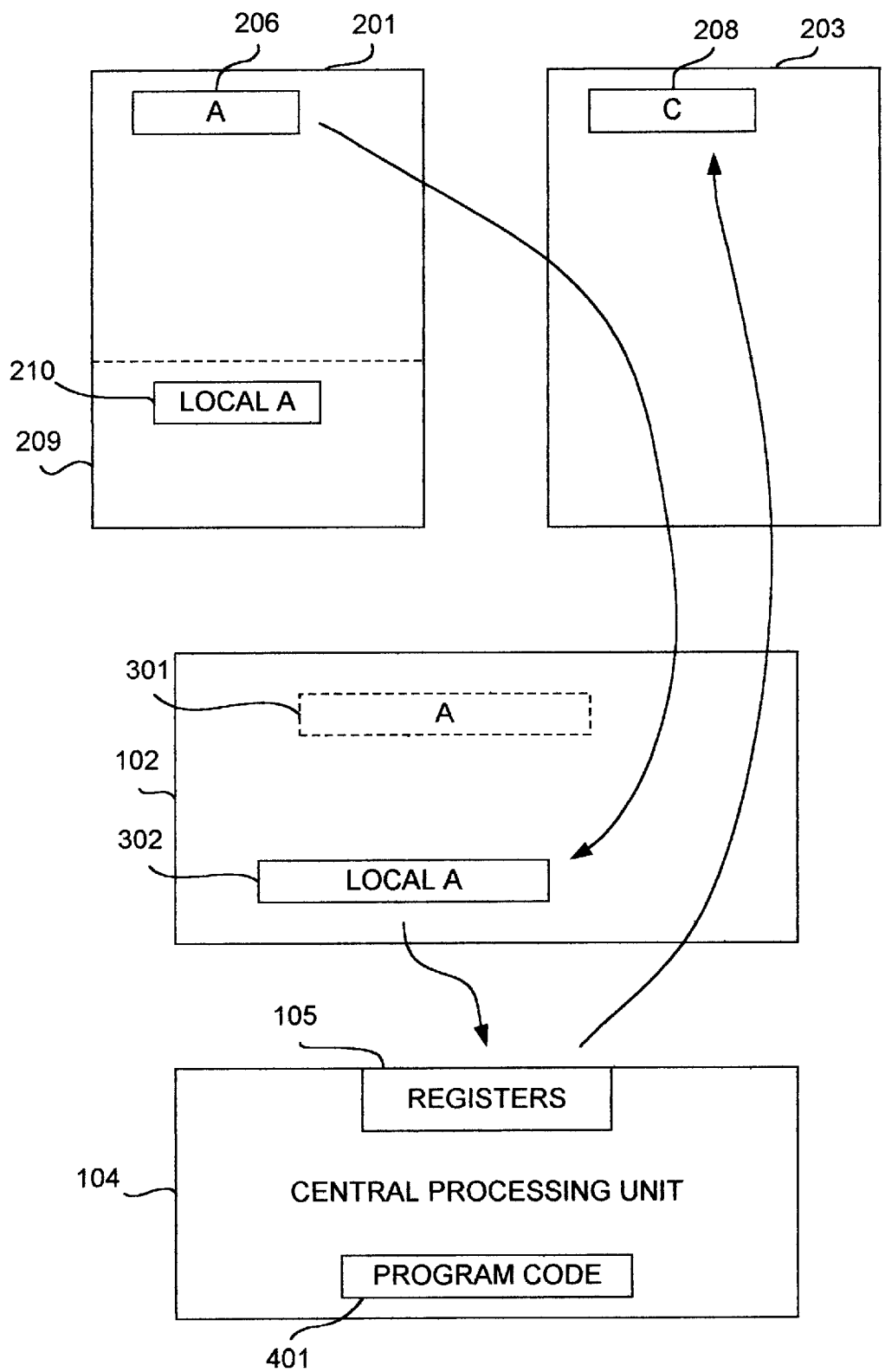
FIG. 4 is a block diagram illustrating a technique in accordance with an embodiment of the present invention.

FIG. 4 is a block diagram illustrating a technique in accordance with an embodiment of the present invention. In this technique, program code 401 of CPU 104 causes data element 206 to be loaded directly to cache location 302, ignoring cache location 301. Since cache location 302 corresponds to local variable 210 in local variables 209, the value at cache location 302 may be read directly into registers 105 of CPU 104. When CPU 104 has completed processing, the result is written directly from registers 105 to data element 208 of data output array 203 bypassing cache 102. It should be noted that data input array 201 and data output array 203 may be stored in the same memory or in different memories. Thus, cache aliasing problems are avoided.

Figure 5A:
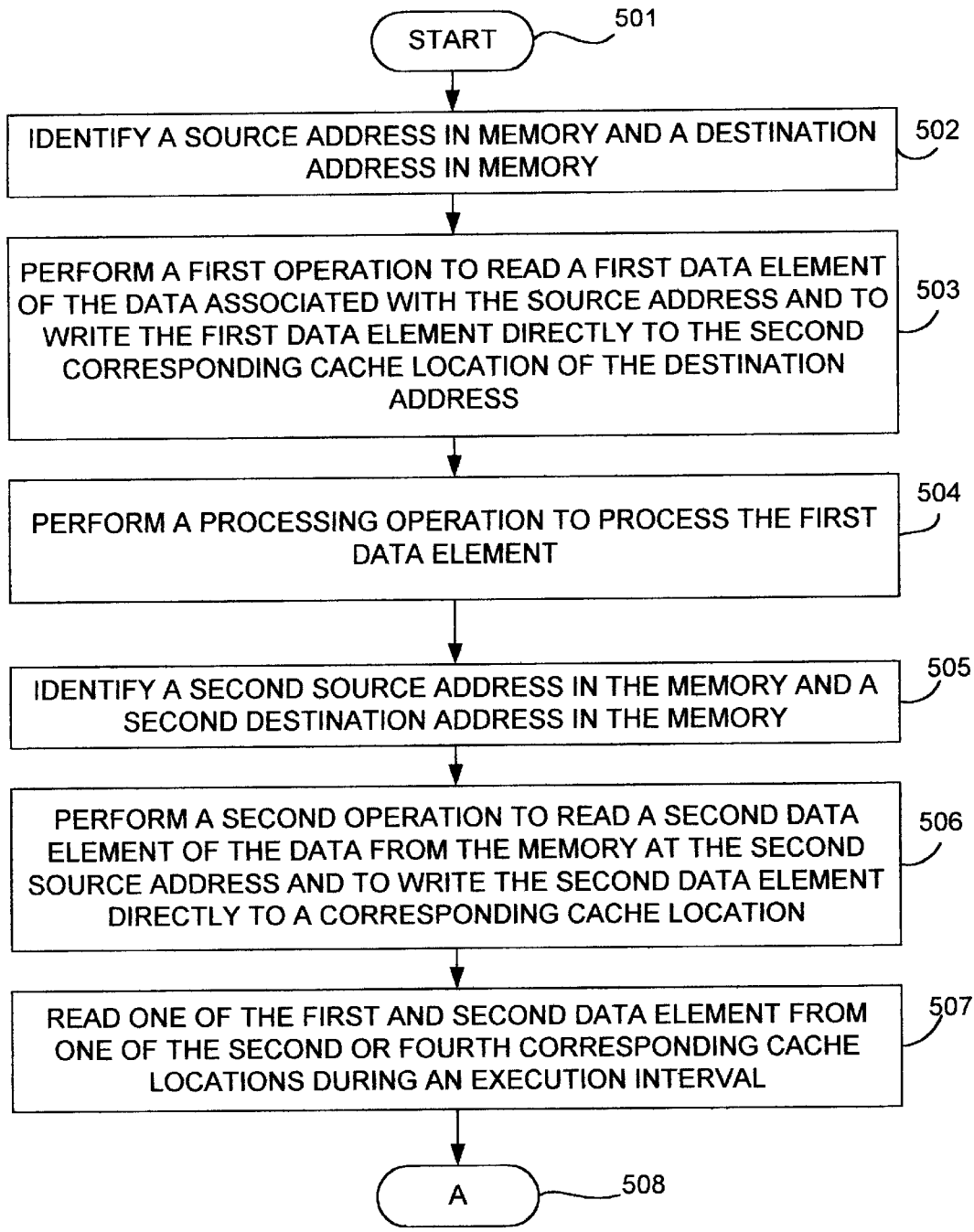
FIGS. 5A and 5B are a flow diagram illustrating a process in accordance with a embodiment of the present invention.
Figure 5B:
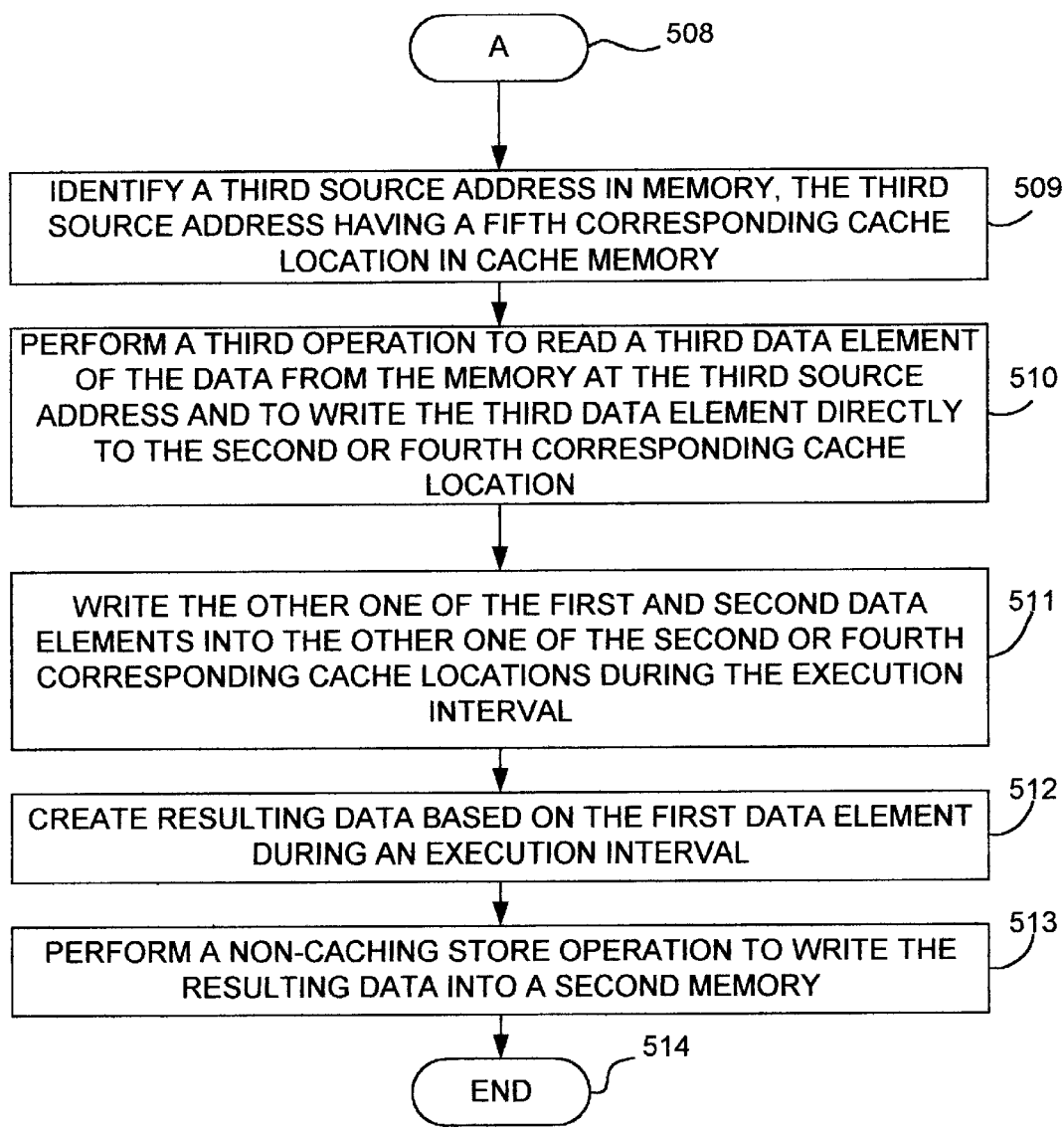
Figure 6:
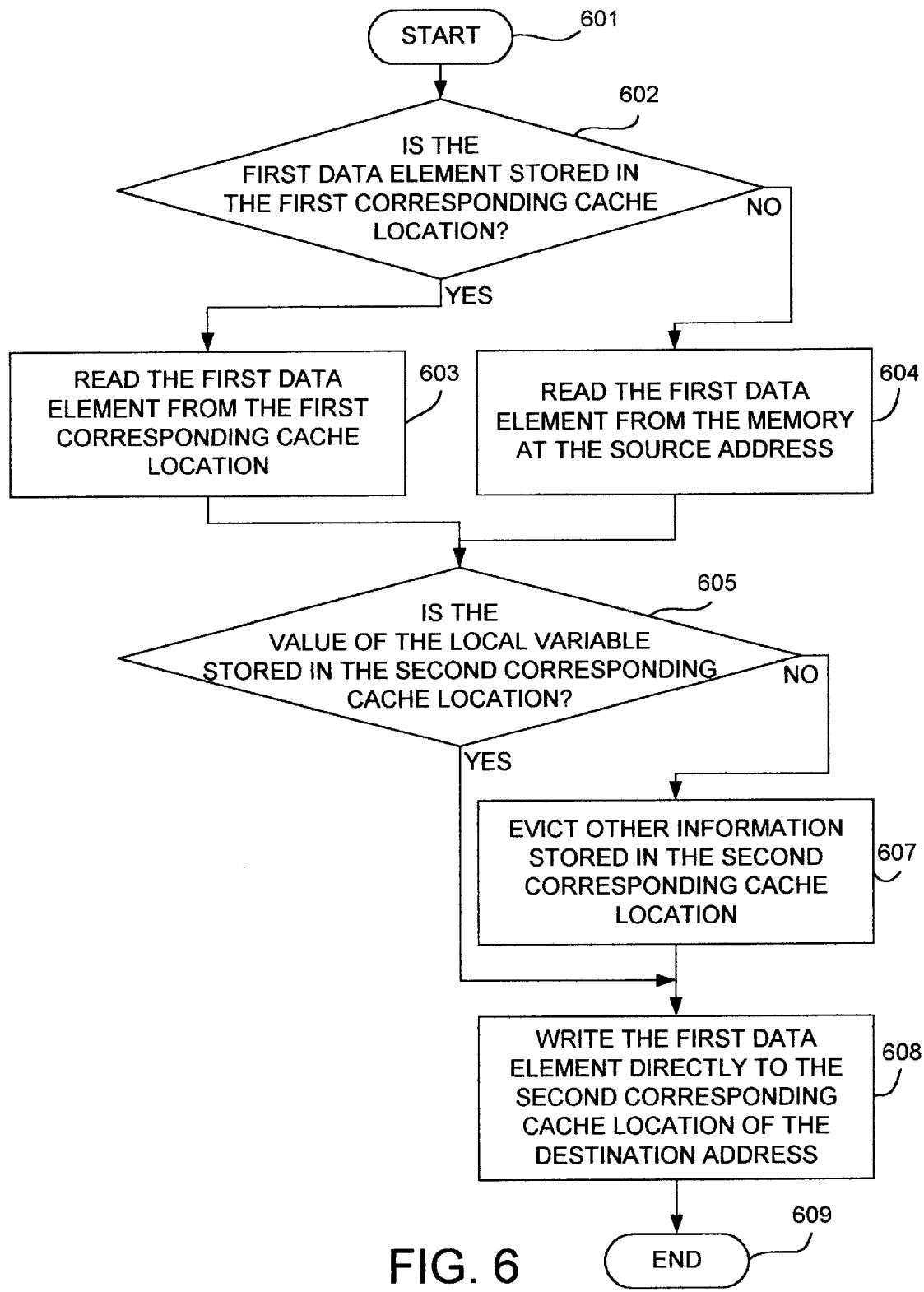
FIG. 6 is a flow diagram illustrating an embodiment of step 503 in accordance with the present invention.

If a CPU is used to implement the invention, it may be used to execute the processes illustrated in FIGS. 5 and 6. The CPU may be a single processing device or a plurality of processing devices. Such a processing device may be a microprocessor, a microcontroller, a digital signal processor, a central processing unit, a microcomputer, a state machine, logic circuitry, and/or any other device that manipulates data and/or signals (analog or digital) based on operational instructions. Program code 401 or other instructions used to implement the invention may be stored in a single memory device or a plurality of memory devices. The memory device may be a random access memory, read-only memory, floppy disk memory, system disk memory, hard drive memory, external magnetic tape memory, CD-ROM, DVD, and/or any device that stores digital information. Note that when the CPU implements one or more of its functions utilizing a state machine and/or logic circuitry, the program code 401 containing the corresponding instructions is embedded within the circuitry comprising the state machine and/or logic circuitry.

FIGS. 5A and 5B are a flow diagram illustrating a process in accordance with a embodiment of the present invention. The process begins in step 501. In step 502, a source address in memory and a destination address in memory are identified. The source address has a first corresponding cache location in cache memory, and the destination address has a second corresponding cache location in cache memory. In step 503, a first operation to read the first data element of the data associated with the source address and to write the first data element directly to the second corresponding cache location of the destination address is performed. In step 504, a processing operation is performed to process the first data element. The processing operation may, for example, be an operation performed in central processing unit 104 to yield a result to be stored in data output array 203. The processing operation preferably occurs at some time after step 503, but before step 506. Alternatively, the processing operation may occur after step 506, for example, immediately after step 507.

In step 505, a second source address in the memory is identified. The second source address has a third corresponding cache location in the cache memory. In step 506, a second operation is performed to read a second data element of the data from the memory at the second source address and to write the second data element to the second corresponding cache location. The second operation is performed subsequent to the first operation. In step 505, a second destination address may also be identified in memory. The second destination address has a fourth corresponding cache location in the cache memory. In that case, in step 506, the second data element may be written directly to the fourth corresponding cache location. Writing the second data element directly to the fourth corresponding cache location may occur when the present invention is practiced as a double (or multiple) buffering embodiment. Alternatively, in step 506, the second data element may be written directly to the second corresponding cache location. Writing the second data element directly to the second corresponding cache location may occur when the present invention is practiced in an embodiment that does not feature double (or multiple) buffering. In step 507, one of the first and second data elements from the second or fourth corresponding cache locations is read during an execution interval. From step 507, the process continues to step 509 via reference A 508.

In step 509, a third source address is identified in memory. The third source address has a fifth corresponding cache location in the cache memory. In step 510, a third operation is performed to read a third data element of the data from the memory at the third source address and to write the third data element directly to either the second corresponding cache location or the fourth corresponding cache location. The third data element is written directly to the fourth corresponding cache location for subsequent data loads for an embodiment of the invention configured to provide pipelining with initialization. However, in the event that the third data element is written directly to the second corresponding cache location, such writing preferably occurs during the second execution interval.

In step 511, the other one of the first and second data elements in the other one of the first or fourth corresponding cache locations is written during the execution interval. In step 512, resulting data is created based on the first data element during the execution interval. In step 513, a non-caching store operation is performed to write the resulting data into a second memory. The process ends in step 514.

The steps of FIGS. 5A and 5B represent an example of a process according to the invention. The invention may be practiced by omitting steps, reordering steps, adding steps, substituting steps, etc. Moreover, steps may be repeated in the process. Repeated steps need not be exactly identical for each repetition. For example, step 507 may be repeated by reading various combinations of the first and second data element from the second and fourth corresponding cache locations. Other steps may be varied in a similar manner.

FIG. 6 is a flow diagram illustrating an embodiment of step 503 in accordance with the present invention. In step 601, the process begins. In step 602, a determination is made as to whether the first data element is stored in a first corresponding cache location. If the first data element is stored in the first corresponding cache location, the process reads the first data element from the first corresponding cache location in step 603. If the first data element is not stored in the first corresponding cache location, the process reads the first data element from the memory at the source address in step 604. From either of step 603 or step 604, the process continues to step 605. In step 605, a determination is made as to whether the value of the local variable is stored in the second corresponding cache location (e.g., a cache location that corresponds to a destination address). If the value of the local variable is stored in the second corresponding cache location, the process writes the first data element directly to the second corresponding cache location of the destination address in step 608. If the value of the local variable is not stored in the second corresponding cache location, the process evicts other information stored in the second corresponding cache location in step 607 and writes the first data element directly to the second corresponding cache location of the destination address in step 608. From step 608, the process ends in step 609.

Figure 7:
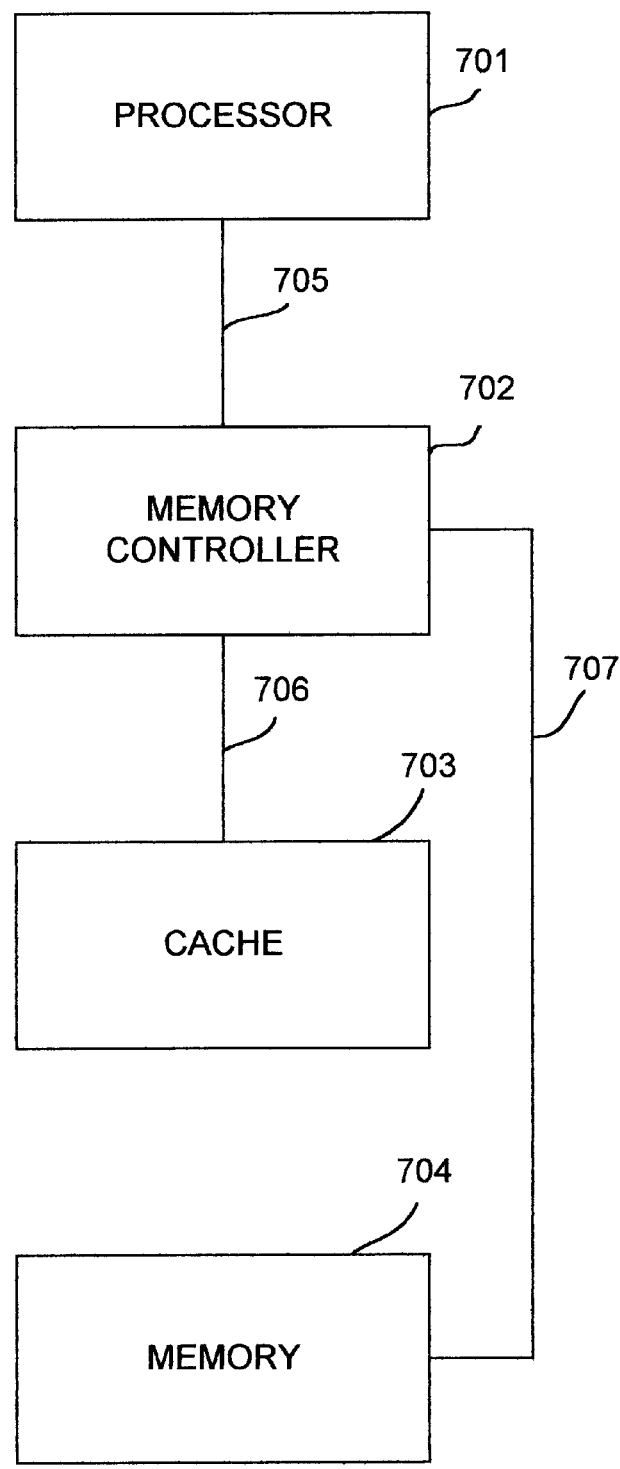
FIG. 7 is a block diagram illustrating apparatus in accordance with an embodiment of the invention.

FIG. 7 is a block diagram illustrating apparatus in accordance with an embodiment of the invention. The apparatus comprises a processor 701, a memory controller 702, a cache 703, and a memory 704. Processor 701 is coupled to memory controller 702 via coupling 705. Memory controller 702 is coupled to cache 703 via coupling 706. Memory controller 702 is coupled to memory 704 via coupling 707.

Processor 701 is configured to execute an instruction specifying a source address in memory 704 and a destination address in memory 704, wherein the source address has a first corresponding cache location in cache 703 and the destination address has a second corresponding cache location in cache 703. Memory controller 702 is operatively coupled to processor 701, to memory 704, and to cache 703 to obtain a first data element associated with the source address and to write the first data element directly to the second corresponding cache location in the cache 703.

When the first data element is stored in the first corresponding cache location of cache 703, memory controller 702 reads the first data element from the first corresponding cache location of cache 703. When the first data element is not stored in the first corresponding cache location of cache 703, memory controller 702 reads the first data element from memory 704 at the source address.

In one embodiment, the destination address comprises a local variable address, and the local variable address provides a location for storage of a value of a local variable. When the value of the local variable is stored in the second corresponding cache location of cache 703, memory controller 702 writes the first data element directly to the second corresponding cache location of the destination address in cache 703. When the value of the local variable is not stored in the second corresponding cache location in cache 703, memory controller 702 evicts other information stored in the second corresponding cache location and writes the first data element directly to the second corresponding cache location of the destination address in cache 703.

Accordingly, a method and apparatus for loading data from memory to a cache has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for loading data from a memory to a cache comprising the steps of:

identifying a source address in the memory and a destination address in the memory, wherein the source address has a first corresponding cache location in the cache and the destination address has a second corresponding cache location in the cache;

performing a first operation to read a first data element of the data associated with the source address and to write the first data element directly from the source address in the memory to the second corresponding cache location of the destination address;

identifying a second source address in the memory, wherein the second source address has a third corresponding cache location in the cache; and performing a second operation to read a second data element of the data from the memory at the second source address and to write the second data element directly to the second corresponding cache location, the second operation performed subsequent to the first operation.

2. The method of claim 1 further comprising the step of:

performing a processing operation to process the first data element, the processing operation occurring after the first operation, but before the second operation.

3. The method of claim 1 further comprising the steps of:

creating resulting data based on the first data element;

performing a non-caching store operation to write the resulting data into the memory.

4. The method of claim 1 wherein the step of performing a first operation further comprises the steps of:

determining whether the first data element is stored in the first corresponding cache location; and when the first data element is stored in the first corresponding cache location, reading the first data element from the first corresponding cache location.

5. The method of claim 4 wherein the step of performing a first operation further comprises the step of:

when the first data element is not stored in the first corresponding cache location, reading the first data element from the memory at the source address.

6. The method of claim 1 wherein the memory includes video data.

7. The method of claim 6 wherein the video data comprises a reference frame of video data.

8. The method of claim 1 wherein the destination address comprises a local variable address, the local variable address providing a location for storage of a value of a local variable.

9. The method of claim 8 wherein the step of performing a first operation further comprises the steps of:

determining whether the value of the local variable is stored in the second corresponding cache location; and when the value of the local variable is stored in the second corresponding cache location, writing the first data element directly to the second corresponding cache location of the destination address.

10. The method of claim 9 wherein the step of performing a first operation further comprises the step of:

when the value of the local variable is not stored in the second corresponding cache location, evicting other information stored in the second corresponding cache location and writing the first data element directly to the second corresponding cache location of the destination address.

11. A program storage device readable by a machine, the program storage device tangibly embodying a program of instructions executable by the machine to perform steps for loading data from a memory to a cache of said machine, said steps comprising:

identifying a source address in the memory and a destination address in the memory, wherein the source address has a first corresponding cache location in the cache and the destination address has a second corresponding cache location in the cache;

performing a first operation to read a first data element of the data associated with the source address and to write the first data element directly from the source address in the memory to the second corresponding cache location of the destination address;

identifying a second source address in the memory, wherein the second source address has a third corresponding cache location in the cache; and performing a second operation to read a second data element of the data from the memory at the second source address and to write the second data element directly to the second corresponding cache location, the second operation performed subsequent to the first operation.

12. The program storage device of claim 11 further comprising instructions to perform the step of:

performing a processing operation to process the first data element, the processing operation occurring after the first operation, but before the second operation.

13. The program storage device of claim 11 further comprising instructions to perform steps of:

creating resultant data based on the first data element;

performing a non-caching store operation to write the resulting data into the memory.

14. The program storage device of claim 11 wherein the instructions to perform the step of performing a first operation further comprise instructions to perform steps of:

determining whether the first data element is stored in the first corresponding cache location; and when the first data element is stored in the first corresponding cache location, reading the first data element from the first corresponding cache location.

15. The program storage device of claim 14 wherein the instructions to perform the step of performing a first operation further comprise instructions to perform steps of:

when the first data element is not stored in the first corresponding cache location, reading the first data element from the memory at the source address.

16. The program storage device of claim 11 wherein the memory includes video data.

17. The program storage device of claim 16 wherein the video data comprises a reference frame of video data.

18. The program storage device of claim 11 wherein the destination address comprises a local variable address, the local variable address providing a location for storage of a value of a local variable.

19. The program storage device of claim 18 wherein the instructions to perform the step of performing a first operation further comprise instructions to perform steps of:

determining whether the value of the local variable is stored in the second corresponding cache location; and when the value of the local variable is stored in the second corresponding cache location, writing the first data element directly to the second corresponding cache location of the destination address.

20. The program storage device of claim 19 wherein the instructions to perform the step of performing a first operation further comprise instructions to perform steps of:

when the value of the local variable is not stored in the second corresponding cache location, evicting other information stored in the second corresponding cache location and writing the first data element directly to the second corresponding cache location of the destination address.

21. An apparatus for processing data comprising:

a memory;

a cache;

a processor configured to execute an instruction specifying a source address in the memory and a destination address in the memory, wherein the source address has a first corresponding cache location in the cache and the destination address has a second corresponding cache location in the cache;

a memory controller operatively coupled to the processor, the memory, and the cache to obtain a first data element associated with the source address and to write the first data element directly from the source address in the memory to the second corresponding cache location in the cache, wherein the destination address comprises a local variable address, the local variable address providing a location for storage of a value of a local variable, and, when the value of the local variable is stored in the second corresponding cache location, the memory controller writes the first data element directly to the second corresponding cache location of the destination address.

22. The apparatus of claim 21 wherein, when the first data element is stored in the first corresponding cache location of the cache, the memory controller reads the first data element from the first corresponding cache location of the cache.

23. The apparatus of claim 22 wherein, when the first data element is not stored in the first corresponding cache location of the cache, the memory controller reads the first data element from the memory at the source address.

24. The apparatus of claim 21 wherein, when the value of the local variable is not stored in the second corresponding cache location, the memory controller evicts other information stored in the second corresponding cache location and writes the first data element directly to the second corresponding cache location of the destination address.

25. A method for loading data from a memory to a cache comprising the steps of:

identifying a source address in the memory and a destination address in the memory, wherein the source address has a first corresponding cache location in the cache and the destination address has a second corresponding cache location in the cache;

performing a first operation to read a first data element of the data associated with the source address and to write the first data element directly from the source address in the memory to the second corresponding cache location of the destination address;

identifying a second source address in the memory and a second destination address in the memory, wherein the second source address has a third corresponding cache location in the cache and the second destination address has a fourth corresponding cache location in the cache; and performing the second operation to read the second data element of the data from the memory at the second source address and to write the second data element directly to the fourth corresponding cache location.

26. The method of claim 25 further comprising the steps of:

identifying a third source address in the memory, wherein the third source address has a fifth corresponding cache location in the cache; and performing a third operation to read a third data element of the data from the memory at the third source address and to write the third data element directly to a selected cache location selected from a group consisting of the second corresponding cache location and the fourth corresponding cache location.

27. The method of claim 25 further comprising the step of:

reading the first data element from the second corresponding cache location during an execution interval, wherein the step of performing a second operation to read a second data element of the data from the memory at the second source address and to write the second data element directly to the fourth corresponding cache location occurs during the execution interval.

28. The method of claim 27 further comprising the steps of:

reading the second data element from the fourth corresponding cache location during a second execution interval;

identifying a third source address in the memory, wherein the third source address has a fifth corresponding cache location in the cache; and performing a third operation to read a third data element of the data from the memory at the third source address and to write the third data element directly to the second corresponding cache location during the second execution interval.

29. A program storage device readable by a machine, the program storage device tangibly embodying a program of instructions executable by the machine to perform steps for loading data from a memory to a cache of said machine, said steps comprising:

identifying a source address in the memory and a destination address in the memory, wherein the source address has a first corresponding cache location in the cache and the destination address has a second corresponding cache location in the cache wherein;

identifying a second source address in the memory and a second destination address in the memory, wherein the second source address has a third corresponding cache location in the cache and the second destination address has a fourth corresponding cache location in the cache; and performing a second operation to read a second data element of the data from the memory at the second source address and to write the second data element directly to the fourth corresponding cache location.

30. The program storage device of claim 29 further comprising instructions to perform the steps of:

identifying a third source address in the memory, wherein the third source address has a fifth corresponding cache location in the cache; and performing a third operation to read a third data element of the data from the memory at the third source address and to write the third data element directly to a selected cache location selected among a group consisting of the second corresponding cache location and the fourth corresponding cache location.

31. The program storage device of claim 29 further comprising instructions to perform step of:

reading the first data element from the second corresponding cache location during an execution interval, wherein the step of performing a second operation to read a second data element of the data from the memory at the second source address and to write the second data element directly to the fourth corresponding cache location occurs during the execution interval.

32. The program storage device of claim 31 further comprising instructions to perform the steps of:

reading the second data element from the fourth corresponding cache location during a second execution interval;

identifying a third source address in the memory, wherein the third source address has a fifth corresponding cache location in the cache; and performing a third operation to read a third data element of the data from the memory at the third source address and to write the third data element directly to the second corresponding cache location during the second execution interval.

* * * * *